(12) United States Patent
Gold et al.

(10) Patent No.: US 8,666,432 B2
(45) Date of Patent: Mar. 4, 2014

(54) METHOD AND SYSTEM FOR INDOOR RF MAPPING

(75) Inventors: Andrew Joseph Gold, Mountain View, CA (US); Gordon Sean Freedman, Ottawa (CA)

(73) Assignee: RF Spot Inc., Moffett Field, CA (US)

( * ) Notice: Subject to any disclaimer, the term of this patent is extended or adjusted under 35 U.S.C. 154(b) by 0 days.

(21) Appl. No.: 13/572,996

(22) Filed: Aug. 13, 2012

(65) Prior Publication Data

US 2013/0095848 A1 Apr. 18, 2013

Related U.S. Application Data

(60) Provisional application No. 61/522,323, filed on Aug. 11, 2011.

(51) Int. Cl.
*H04W 24/00* (2009.01)

(52) U.S. Cl.
USPC .............. 455/456.1; 455/404.2; 455/414.1; 455/423; 455/418; 455/421

(58) Field of Classification Search
USPC ......... 455/456.1, 404.2, 414.1, 423, 418, 421
See application file for complete search history.

(56) References Cited

U.S. PATENT DOCUMENTS

| | | | |
|---|---|---|---|
| 5,732,354 A | 3/1998 | MacDonald | |
| 5,848,373 A | 12/1998 | DeLorme et al. | |
| 6,091,956 A | 7/2000 | Hollenberg | |
| 6,167,274 A | 12/2000 | Smith | |
| 7,346,359 B2 | 3/2008 | Damarla et al. | |
| 7,383,051 B2 | 6/2008 | Spain, Jr. et al. | |
| 7,433,693 B2 * | 10/2008 | Sheynblat | 455/456.1 |
| 7,522,049 B2 | 4/2009 | Aljadeff et al. | |
| 7,532,836 B2 | 5/2009 | Friday et al. | |
| 7,664,511 B2 | 2/2010 | Wang et al. | |
| 7,706,814 B2 | 4/2010 | Sillasto et al. | |
| 7,725,111 B2 | 5/2010 | Dressler et al. | |
| 7,768,395 B2 | 8/2010 | Gold | |
| 7,822,426 B1 | 10/2010 | Wuersch | |
| 7,848,765 B2 | 12/2010 | Phillips et al. | |
| 7,899,467 B2 | 3/2011 | Feuerstein et al. | |
| 7,903,029 B2 | 3/2011 | Dupray | |
| 2008/0134303 A1 * | 6/2008 | Rekimoto | 726/4 |
| 2013/0195314 A1 * | 8/2013 | Wirola et al. | 382/103 |

OTHER PUBLICATIONS

Online data sheet at http://www.aeroscout.com/files/AeroScout%20MobileView%20Data%20Sheet.pdf. 2009, pp. 1 to 2 [as printed].

* cited by examiner

*Primary Examiner* — Nghi H Ly
(74) *Attorney, Agent, or Firm* — The Noblitt Group, PLLC

(57) ABSTRACT

A method is disclosed for determining a location of a mobile electronic device. The mobile electronic device receives an RF signal providing RF fingerprint data and receives a third party location estimate from a third party service. Location data is collected by a dead reckoning system and corresponds to RF fingerprint data and third party estimates collected for a plurality of locations. A correlation between the RF fingerprint data, the third party location estimates, and location data is determined providing a transform for transforming the third party location estimates into a more accurate location estimate of the mobile electronic device.

22 Claims, 4 Drawing Sheets

METHOD AND SYSTEM FOR INDOOR RF MAPPING

FIELD OF THE INVENTION

The invention relates generally to location analysis and more particularly to RF based position determination.

BACKGROUND

The ability to locate RF devices within a building, has long been sought after. Attempts to locate laptops, for example, and tagged devices have been proposed wherein a plurality of wireless receivers each transmit a signal and then try to identify through triangulation, for example, a location of the RF signal source. In one such system, phased array antennas used for each of the wireless receivers allow them to determine angle of incidence of the RF signals. With two receivers, an accurate estimation of transmitter location is possible in a test environment. Unfortunately, in real world environments reflections and other signal distortions result in errors in the location determinations and as such these systems are problematic in commercial applications.

More recently, RF fingerprinting has been studied wherein a receiver is in motion and transmitted signals received thereby are used to estimate location. It has been found that with one transmitter in a controlled environment, it is possible to accurately estimate location. Unfortunately, like the other prior art, real world applications have eluded this technology for many reasons. First, there are signal reliability issues where noise levels, reflections, interference, weather, speed, receiver battery levels, etc, all affect the results. Second, in highly controlled environments it is easier to assure uniqueness of a received RF signal at every point within the controlled space. Third, controlled environments are highly static whereas the commercial world is not. Fourth, in a controlled environment certain features are excluded as problematic whereas in a commercial application, someone does not want to hear that they need to replace all of their metal fixtures with plastic ones.

It would be advantageous to provide a method and system for supper commercial indoor RF based location services.

SUMMARY OF EMBODIMENTS OF THE INVENTION

A method comprising providing RF fingerprint data related to each of a plurality of locations wherein the plurality of locations comprises a first location; at each of the plurality of locations: receiving from a third party third party location estimate data based on sensed signals; sensing location data indicative of a geographical location; processing the RF fingerprint data and the RF fingerprint location data associated therewith, the third party location estimate data, and the location data to determine correlation data comprising a first transform for transforming the third party location estimate data to determine second location estimate data; and storing the third party location estimate data and the correlation data for each of the plurality of locations.

A system comprising a first sensor for sensing location data indicative of a geographical location; a second sensor for sensing third party location estimate data: a processor for processing RF fingerprint data, the third party location estimate data, and the location data to determine correlation data; and a data, storage wherein the location estimate data and the correlation data is stored within;

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
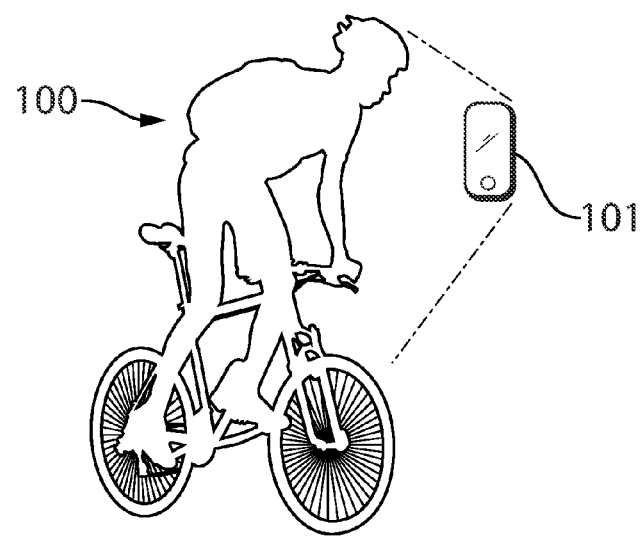
FIG. 1 illustrates a user using a third party location service according to the prior art.

Location estimation technologies are reasonably reliable outdoors, however once near or inside a building, the reliability is often reduced. Interference from building materials, walls and ceilings with the wireless signal, for determining the location of a mobile device, often results in inaccurate location estimations. FIG. 1 illustrates a user using a third party location service according to the prior art. For example, a user in the form of a bicycle courier 100 uses a third party location service, in the form of Google® maps, to provide his current location coordinates and to map routes to customer buildings. Courier 100 uses a mobile device, in the form of iPhone 101, for navigation through out the city. Courier 100 inputs a customer's address into the Google® maps interface displayed on iPhone® 101. Google® maps provides a path on a map from the courier's location to the customer's building. Courier 100 bikes along the provided path and delivers a package to the customer. Subsequently, courier 100 travels several blocks to his favorite bistro for lunch and while waiting inside to be served the inputs the next customer's address into the Google® maps interface displayed on iPhone® 101. Google® maps provides a path on a map, however the start location of the path other than originates from the courier's location instead it originates from a location, across town. Realizing there is an error in the route provided courier 100 waits until after lunch to try again. Once outside the bistro, courier 100 requests Google® maps for a route to the next customer building. This time Google® maps provides a path on a map from the courier's actual location to the customer's building. Alternatively the mobile device is any one of a laptop computer, tablet, iPad®, personal digital assistant (PDA), music playing device, mobile phone. Further alternatively the mobile device is a device comprising a processor. Optionally, the third party location service is Mapquest® or Bing Maps®.

Figure 2:
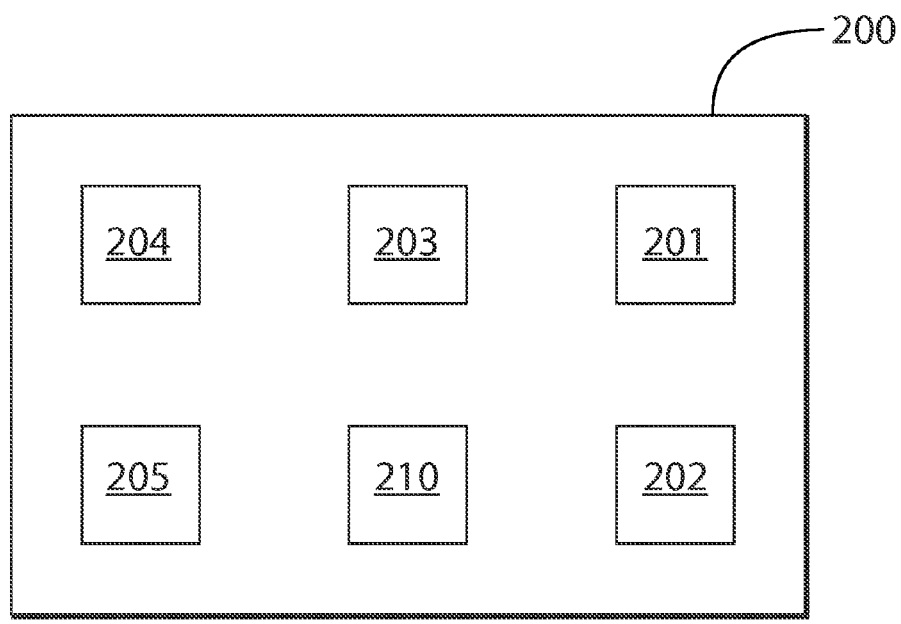
FIG. 2 illustrates a simplified block diagram of a system for capturing third party location service location estimates in a building.

According to an embodiment of the invention RF fingerprint data, associated RF location data, third party location service estimate data, and associated first location data is correlated to result in a more accurate second location estimate. FIG. 2 illustrates a simplified block diagram of a system for capturing third party location estimates in a building. System 200 is shown comprising a plurality of components including the following: a location sensor in the form of dead reckoning system 201, a portable wireless communication device in the form of an iPhone 202, a memory circuit 203 and a processor 204. For example, memory circuit 203 comprises a removable memory circuit such as a USB key. Alternatively, the memory circuit is replaced by a communication circuit for communicating the data from the system 200 to a server for storage. Optionally, the system is implemented on a rolling cart to facilitate moving of the system inside a space. Further optionally, the system 200 comprises GPS receiver 210 for indicating a geo-location when outside of the space.

The system 200 further comprises a port for coupling with portable wireless communication devices in the form of cellular phones, smart phones, mobile tablets, laptops, and mobile modems 205. Of course, other wireless devices are also contemplated for use with the system 200. Thus for example, the system 200 is implemented with an Android® smart phone, a Blackberry® phone, a Windows® 7 phone, etc. each receiving third party location estimate data and providing the estimate data to system 200 for storage. Optionally more than one wireless communication device is coupled to system 200.

Figure 3:
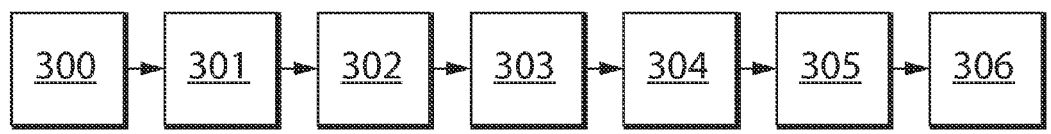
FIG. 3 illustrates a simplified flow diagram of a system for mapping locations based on third party location service location data.

Referring to FIG. 3, shown is a simplified flow diagram of a system such as that shown in FIG. 2 for mapping locations based on third party location estimates. The system is set up and powered for use at an outside location at 300. The system provides an indication of GPS signal reception at 301. At this point, a reasonably accurate location is known for the system 200. At 302, the system is wheeled into the space in the form of a shopping mall. The system is provided with a dead reckoning system 201 and, as such, provides an indication from the dead reckoning system 201 of actual motion and location of the system 200. Optionally, the dead reckoning system comprises a distance sensor, for example optically encoded wheels, to determine the location of the system 200. Optionally, the distance sensor comprises a non-contact distance sensor, for example a video camera. At 303, the system is moved through a path. The path is preferably selected to be short enough to allow for relatively small dead reckoning system error while being long enough to maintain a level of efficiency in data gathering. Throughout the movement of 304, the system iteratively receives third party location estimate data and provides the estimate data and the dead reckoning data for storage 305 within memory circuit 203. Alternatively, the data is transmitted via a wireless data communication signal to a server for storage thereby. Though the system is described with a collection of raw data from the third party location service, it is also possible to preprocess the data before storage thereof. That said, storage of more raw data is useful in improving and maintaining of a data set so formed. The process continues until 306 where the system is returned to a location where a GPS signal is received and a clear indication of location is thereby achieved.

Once a path is traversed, the process is repeated for numerous other paths within a same space. This allows for capturing data relating to third party location service location estimates received at each of a plurality of interior locations and storing the data in association with known location data based on dead reckoning data. Combining the data captured from the plurality of paths keeps the error introduced by the dead reckoning system to a minimum. Alternatively system 200 traverses the building once to capture the data. Optionally, system 200 comprises wireless communication devices for collecting RF fingerprint data wherein RF fingerprint data is collected simultaneously with third party location service location estimate data and associated location data. Optionally, the wireless communication device is a cell phone, smart phone, tablet, or other device comprising at least a receiver circuit for receiving RF signals according to each of at least two standards, the first standard is other than the second standard. Examples of standards are Wi-Fi, Bluetooth®, 4G or later cellular signals, other than the GPS standard. Further optionally RF fingerprint data and associated location data is collected independently of the collection of third party location service location estimate data and corresponding location data.

Once sufficient data is captured, then processing of the data to determine a statistical relationship between RF fingerprint data and third party location estimate data and location data is performed. The processing attempts to determine a correlation between RF fingerprint data and third party location estimate data and location data resulting in correlation data. The correlation data is then used to determine a more accurate second location estimate for a first location of a wireless based on sensed RF Fingerprint data and a received third party location estimate. Of course, processing could occur during capture, after capture, or during use of the data depending on the system requirements, performance, and other design criteria. Optionally, collecting third party location estimate data is repeated wherein increasing the number of data samples acquired improves the probability of successfully determining a relationship between RF fingerprint data and a received third party location estimate data.

Once the raw data is uploaded from the dead reckoning system to the server it is processed. Alternatively the data is transferred to the server via the removable memory circuit comprising the raw data, for example a USB key. Further alternatively, the data is preprocessed prior to being transferred to a database. The dead reckoning data and the GPS data are made consistent. This involves evaluating an error vector for the dead reckoning data and applying a corrective function to the location data within the raw data in order to result in corrected location data. When an error vector is very small, correction is other than applied. Of course, in an error vector determination, known imprecision in GPS positioning is optionally taken into account.

Figure 4:
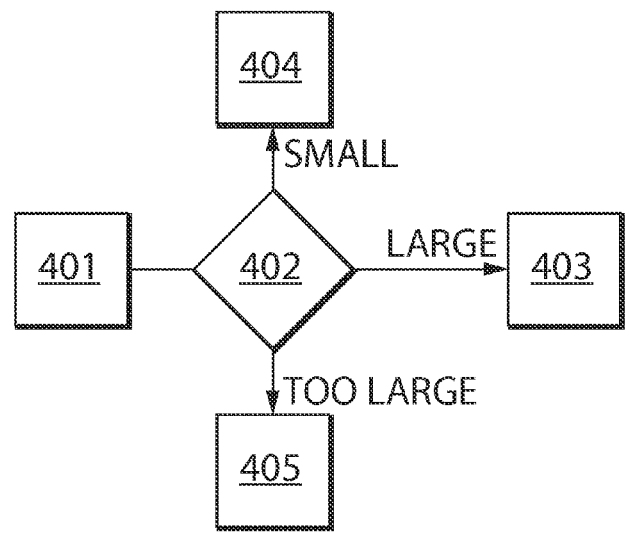
FIG. 4 illustrates a flow diagram of processing data collected by the dead reckoning system by the server.

FIG. 4 illustrates a flow diagram of processing data collected by the dead reckoning system by the server. Once the raw data has been uploaded from the dead reckoning system, for example via a Wi-Fi data communication network, the raw data is processed at 401. The server evaluates an error vector for the dead reckoning system at 402. When the error vector is sufficiently large but not too large, a corrective function is applied to the location data wherein the location data is corrected for errors at 403. When the error vector is very small 404, a corrective function is other than applied to the location data. Typically, a very small error is one that is within a predetermined tolerance for location errors for the system. When an error is very large 405, the data is preferably discarded and new data is captured in an attempt to acquire better source data. Optionally, an indication of data collection error is provided.

Optionally third party location estimate data is gathered from a plurality of mobile wireless devices and correlation data is determined for each.

Optionally the dead reckoning system comprises an altimeter used for collecting altitude data. By collecting altitude data, the third party location estimate data, and location data simultaneously, it is possible to account for errors resulting from movement up or down as are known to occur. For example, in traversing a ramp up and down, a dead reckoning system will determine a distance traveled but location only varies along the horizontal direction—two vectors of the three in three-space. Thus, a greater distance may actually be traveled without an actual error having occurred in the dead reckoning system measurement. Optionally, a compensation function is applied to the location data to correct errors based on altitude data.

According to an embodiment of the invention the relationship between a received third party location estimate and RF fingerprint data indicative of a sensed RF signal resulting in a more accurate second location estimate is a relationship of highly correlated, significantly correlated, or not correlated.

For example, system 200 described above, is used to collect third party location estimates and associated location data for building A. RF fingerprint data for building A was collected previously. Processing third party first location estimates, RF fingerprint data, and associated location data for building A to result in a more accurate second location estimate provides correlation data indicating a high correlation between the datasets. In fact the correlation data comprises a transfer function that when applied to the third party first location estimate and RF fingerprint data from a received RF signal, provides a highly accurate second location estimate. Often, a high correlation between the third party first location estimate and RF fingerprint data is due to a low variation in the third party first location estimate. For example, for a given location the third party first location estimate is consistent over a significant period of time. Alternatively, the correlation data comprises a mathematical function.

Alternatively, the variation is dependent upon the building, a third party location service, a mobile device, or a combination thereof. Optionally, the cause of the variation is determined and correlation data is modified to compensate for the variation. Alternatively, the correlation data indicates that the transform is a function of a determinable characteristic. For example the transfer function is a function of a defined space, such as a building. Another example includes the transfer function is a function of the building material in which the wireless device is located. A further example includes the transfer function as function of the room building in which the wireless device is located. Yet a further example of a determinable characteristic is the wireless RF receiving device sensing the RF signals. Further alternatively the variation is caused by a transient condition, wherein the accuracy of the second estimate is reduced during the time period of the transient condition.

Even further alternatively, the transient condition is indicated to the user. For example, the accuracy of the second location estimate provided by a mobile device is high when the mobile device's battery is fully charged. However the accuracy decreases, as the battery power is decreases. A low battery condition and its affect on the second location estimate accuracy is indicated to the user providing the user the opportunity to replace the battery and improve the second location estimate accuracy.

Another example, system 200 described above, is used to collect third party location estimates and associated location data for building B. RF fingerprint data for building B was collected previously. Processing third party first location estimates, RF fingerprint data, and associated location data for building B to result in a more accurate second location estimate provides correlation data indicating a meaningful correlation between the datasets. Unlike building A, the correlation data other than comprises a transfer function that when applied to the third party first location estimate and RF fingerprint data from a received RF signal, provides a highly accurate second location estimate. However, the correlation data indicates that there is a statistical relationship relating the datasets, resulting in the need for more processing to determine an accurate second location estimate in contrast to applying a transfer function to the data as described above for building A. Often, a significant correlation between the third party first location estimate and RF fingerprint data is due to reasonable variation in the third party first location estimate. For example, for a given location the third party first location estimate varies within an acceptable given range over a significant period of time.

Alternatively, the variation is dependent upon the building, a third party location service, a mobile device, or a combination thereof. Optionally, the cause of the variation is determined and correlation data is modified to compensate for the variation. Alternatively, the correlation data indicates that the transform is a function of a determinable characteristic. For example a transfer function is a function of the building in which the wireless device is located. Another example the transfer function is a function of the room building in which the wireless device is located.

Further alternatively the variation is caused by a transient condition, wherein the accuracy of the second estimate is reduced during the time period of the transient condition. Even further alternatively the transient condition is indicated to the user. For example, the accuracy of the second location estimate provided by a mobile device is high when the mobile device's battery is fully charged. However the accuracy decreases, as the battery power decreases. A low battery condition and its affect on the second location estimate accuracy is indicated to the user providing the user the opportunity to replace the battery and improve the second location estimate accuracy.

Yet another example, system 200 described above, is used to collect third party location estimates and associated location data for building C. RF fingerprint data for building C was collected previously. Processing third party first location estimates, RF fingerprint data, and associated location data for building C to result in a more accurate second location estimate provides correlation data indicating a low correlation between the datasets. Unlike building A correlation data and building B correlation data, building C correlation data indicates other than a statistical relationship relating the datasets. Often, a low correlation between the third party first location estimate and RF fingerprint data is due to high variation in the third party first location estimate. For example, for a given location the third party first location estimate varies outside an acceptable given range over a significant period of time. In this example the correlation data, thus the second location estimate, is other than dependent upon third party location estimates and dependent upon RF fingerprint data.

Alternatively, the variation is dependent upon the building, a third party location service, a mobile device, or a combination thereof. Optionally, the cause of the variation is determined and correlation data is modified to compensate for the variation. Alternatively, the correlation data indicates that the transform is a function of a determinable characteristic. For example a transfer function is a function of the building in which the wireless device is located. Another example the transfer function is a function of the room building in which the wireless device is located.

Further alternatively, the variation is caused by a transient condition, wherein the accuracy of the second estimate is reduced during the time period of the transient condition. Even further alternatively, the transient condition is indicated to the user. For example, the accuracy of the second location estimate provided by a mobile device is high when the mobile device's battery is fully charged. However the accuracy decreases, as the battery power decreases. A low battery condition and its affect on the second location estimate accuracy is indicated to the user providing the user the opportunity to replace the battery and improve the second location estimate accuracy.

Alternatively, the mobile device comprises a cell phone, smart phone, mobile tablet, laptop, Android® smart phone, a Blackberry® phone, or a Windows® 7 phone. Alternatively the third party location service is provided by Google® maps or Mapquest®. Optionally the sensed RF signal comprises cellular signal, Bluetooth® signal, or any combination thereof. Alternatively the correlation data comprises a transfer function other than a linear transfer function.

Figure 5:
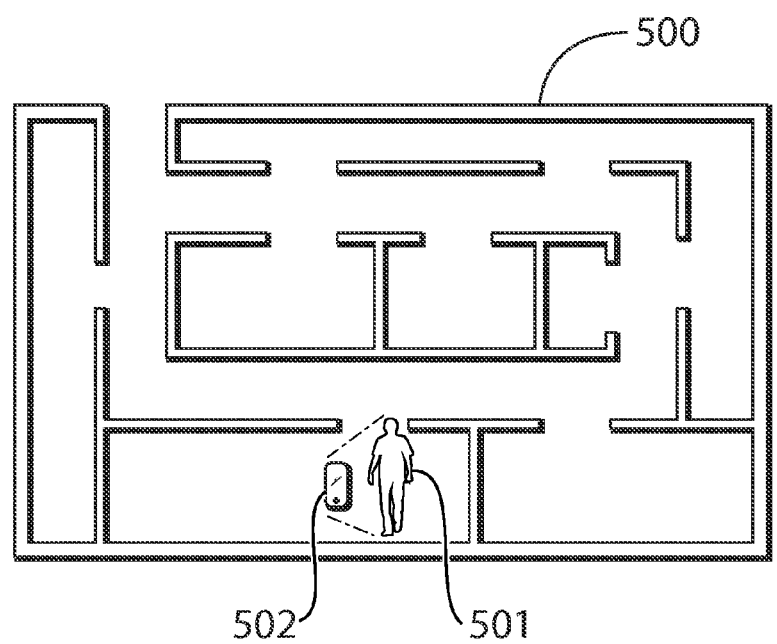
FIG. 5 illustrates a museum 500 for which correlation data, correlating third party location estimates and RF fingerprint data, has been determined.

According to an embodiment of the invention correlation data indicates a process for transforming received third party location estimates and RF fingerprint data indicative of a sensed RF signal to result in a more accurate second location estimate. For example, shown in FIG. 5 is museum 500 for which correlation data, correlating third party location estimates and RF fingerprint data, has been determined. A user in the form of patron 501 uses a mobile device, in the form of smartphone 502, for navigation within museum 500. Smartphone 502 is running a museum mapping application comprising the correlation data to provide directional maps of the museum to patron 501. The museum mapping application is receiving first location estimates from a third party location service in the form of Mapquest®. In this example the correlation data indicates a process that comprises gathering a plurality of first location estimates for a given period of time for determining a more accurate second location estimate. The precision of Mapquest® location estimates is other than high inside the museum, however most of the time the location estimates do not vary beyond an acceptable range. The museum mapping application transform process relies upon several consecutive first location estimates, for a given location, as inputs to provide a more accurate second location estimate in comparison to the first location estimates. However, should this process result in second location estimates which vary outside an acceptable range, the process is iterated until the second location estimates fall within an acceptable range or subsequent to a given number of iterations, does not fall within an acceptable range.

Patron 501 has finished viewing impressionist paintings at location A. Wishing to view modern art located in another section of the museum, the patron inputs modern art as her next destination into the mapping application running on smartphone 502. The mapping application receives a plurality of consecutive first location estimates for a specific period of time. Each first location estimate varies by at least 4.5 m in longitude and 5 m in latitude. Smartphone 503 detects an RF signal at the patron's location. RF fingerprint data indicative of the RF signal is determined and input into the transform process of the mapping application. The first estimates and RF fingerprint data are processed resulting in a highly accurate second location estimate for the patron's starting location. The museum mapping application provides a route beginning at the second location estimate to the modern art section on the museum map displayed on the smartphone's screen.

Alternatively, the mobile device comprises a cell, phone, mobile tablet, laptop, Android® smart phone, a Blackberry® phone, or a Windows® 7 phone. Alternatively the third party location service is provided by Google® maps or Bing Maps®. Optionally the sensed RF signal comprises cellular signal, Wi-Fi, Bluetooth® signal, or any combination thereof.

Figure 6:
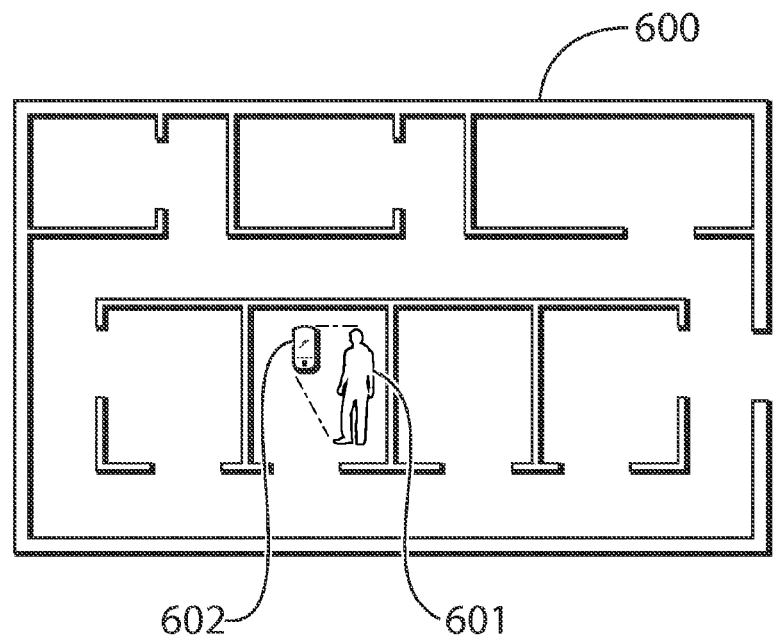
FIG. 6 illustrates a processing plant for which correlation data, correlating third party location estimates and RF fingerprint data, has been determined.

According to an embodiment of the invention correlation data indicates a process for transforming a received third party location estimate and RF fingerprint data indicative of a sensed RF signal to result in a more accurate second location estimate wherein the process comprises a plurality of processes that are dependent on a condition. For example, shown in FIG. 6 is a processing plant 600 for which correlation data, correlating third party location estimates and RF fingerprint data, has been determined. A user in the form of employee 601 uses a mobile device, in the form of Blackberry® 602, for navigation within processing plant 600. Blackberry® 602 is running a plant mapping application comprising the correlation data and provides directional maps of plant 600 to employee 601. The plant mapping application is receiving first location estimates from a third party location service in the form of Google® maps. In this example the correlation data indicates a process that comprises using a specific transformation that is dependent on a condition. For example, the plant mapping application uses a first process during day light hours, a second process at dusk and dawn, and a third process at night. The heat from the sun heats the air, which is the medium through which the RF signals used by mapping applications to provide first location estimates travel. The heated air affects the RF signals in a manner that results in low variability of the first location estimate during day and night wherein the air temperature is relatively stable, and high variability of the first location estimate during dusk and dawn wherein the air temperature changes significantly during the transition period between day to night and night to day.

Figure 6A:
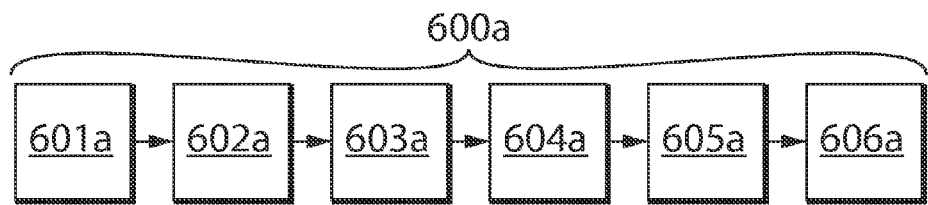
FIG. 6a illustrates flow chart of a plant mapping application process for transforming Google® maps' first location estimate and the RF fingerprint data indicative of sensed RF signal to result is a more accurate second location estimation.

FIG. 6a illustrates flow chart 600a of the plant mapping application process for transforming Google® maps' first location estimate and the RF fingerprint data indicative of sensed RF signal to result in a more accurate second location estimation. At 601a employee 601 inputs the packaging department as his destination into the plant mapping application running on Blackberry® 603. Blackberry® 603 detects an RF signal at the employee's location and RF fingerprint data indicative of the RF signal is determined at 602a. The mapping application receives a first location estimate from Google® maps at 603a and detects the time of day from Blackberry® 603 clock at 604a. At 605a RF fingerprint data, first location estimate and the time of day are input into the plant mapping application process. The process chooses the transformation based on the time of day to provide the second location estimate at 606a. The plant mapping application provides a route beginning at the second location estimate to the packaging department on the plant map displayed on the Blackberry's screen. For example, if the time is 2 pm, the transformation that is used for this time of day is the Day transformation comprising a first transfer function, however, if the time is 2 am, the Night transformation comprising a second transfer function, is implemented. Dusk and dawn are transitional periods between day and night wherein the relationship between RF fingerprint data and first location estimate is other than modeled as a transfer function. During dusk and dawn time periods the first location estimate are highly variable which influences the accuracy of the transformation and the second location estimate. Optionally, the lower accuracy of the second location estimate is indicated to the user. Further optionally, a third party weather service provides a plurality of temperatures of the local area to the plant mapping application during the dusk and dawn transitional periods. The temperatures are input into the transformation function for compensating for the affect of the change of temperature on the first location estimate.

Alternatively, the mobile device comprises a cell phone, mobile tablet, laptop, Android® smart phone, an iPhone®, or a Windows® 7 phone. Alternatively the third party location service is provided by Mapquest® or Bing Maps®. Optionally the sensed RF signal comprises cellular signal, Wi-Fi, Bluetooth® signal, or any combination thereof.

Figure 7:
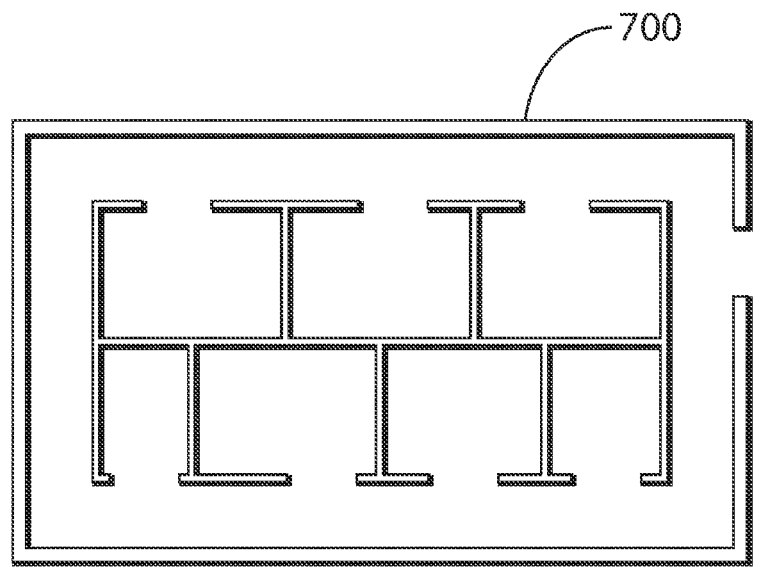
FIG. 7 illustrates a data centre.

According to an embodiment of the invention correlation data indicates a process for transforming a received third party location estimate and RP fingerprint data indicative of a sensed RF signal to result in a more accurate second location estimate wherein the first location estimate is other than stable however the correlation between the first location estimate and RF fingerprint data are other than random, resulting in a transformation that provides a more accurate second location estimate in comparison to the first location estimate. For example, shown is FIG. 7 is large data centre 700 for which RF fingerprint data, first location estimate data, and associated location data has been previously collected using a system similar to system 200. The operator of system 200 reviews the data collected and notices that first location estimates provided by a third party service vary greatly between locations spatially proximate one another. It appears to the operator that there is other than a statistical relationship between the RF fingerprint data and first location estimates mainly because the first location estimates are other than stable. RF fingerprint data, first location estimate data, and associated location data are input into a computer process, for example a neural network, for determining the relationship, if any, between the datasets. The result of the computer process is a transformation for transforming RF fingerprint data and first location estimates, into more accurate second location estimates indicating that there is a statistical relationship between the datasets although the first location estimates appear highly unstable. Alternatively, there is other than a correlation between the datasets wherein the computer process other than determines a transform to transform RF fingerprint data and first location estimate data into a more accurate second location estimate in comparison to the first location estimate.

Alternatively the third party location service is provided by Google® maps or Mapquest®. Optionally the sensed RF signal comprises cellular signal, Wi-Fi, Bluetooth® signal, or any combination thereof.

Numerous other embodiments of the invention will be apparent to persons skilled in the art without departing from the scope of the invention as defined in the appended claims.

What is claimed is:

1. A method comprising:
    providing RF (radio frequency) fingerprint data related to each of a plurality of locations wherein the plurality of locations comprises a first location; at each of the plurality of locations:
    receiving from a third party location estimate data based on sensed signals;
    sensing location data indicative of a geographical location;
    processing the RF fingerprint data, the third party, location estimate data, and the location data to determine correlation data, comprising a first transforming for transforming the third party location estimate data to determine second location estimate data; and
    storing the third party location estimate data and the correlation data for each of the plurality of locations.

2. A method according to claim 1 wherein the location data comprises data indicative of a relative displacement captured using a first system comprising a dead reckoning system.

3. A method according to claim 1 wherein the RF fingerprint data comprises data indicative of a sensed RF signal comprising a wireless signal according to a first standard and a wireless signal according to a second standard, the first standard other than the second standard, and the first standard and second standard other than a Global Positioning System standard.

4. A method according to claim 1 wherein sensing the location data comprises determining a first position using a Global Positioning System standard, the relative displacement relative to the first position.

5. A method according to claim 2 wherein the dead reckoning system comprises a distance sensor.

6. A method according to claim 5 wherein the distance sensor is a non-contact distance sensor.

7. A method according to claim 5 wherein the distance sensor comprises optically encoded wheels.

8. A method according to claim 2 comprising:
    detecting an error in the location data captured by the dead reckoning system; and
    applying a corrective function to the location data to compensate for the error.

9. A method according to claim 1 comprising sensing altitude of the first location to provide altitude data.

10. A method according to claim 9 comprising applying a compensation function to the location data for errors based on changes in altitude.

11. A method according to claim 1 wherein the correlation data comprising the first transform is associated with a defined area.

12. A method according to claim 11 wherein the defined area is a building.

13. A method according to claim 11 wherein the defined area is a room.

14. A method according to claim 1 wherein the transform comprises a mathematical function.

15. A method according to claim 1 wherein the transform comprises a process.

16. A method according to claim 15 wherein the process is iterative.

17. A method according to claim 1 wherein the correlation data comprises a plurality of transforms relating to the first location wherein one of the plurality of transforms is selected for transforming third party location estimate data based on a first known determinable characteristic other than the RF fingerprint data and the third party location estimates.

18. A method according to claim 17 wherein the first known determinable characteristic is the time of day.

19. A method according to claim 17 wherein the first known determinable characteristic is building material.

20. A method according to claim 1 wherein the transform is a function of location estimates based on the RF fingerprint data.

21. A method according to claim 1 wherein the transform is a function of the third party location estimates.

22. A method according to claim 1 wherein the transform is a function of a wireless RF receiving device for sensing RF signals to determine the RF fingerprint data and for receiving the third party location estimates.

* * * * *